United States Patent
Walcutt et al.

(10) Patent No.: US 10,675,636 B2
(45) Date of Patent: Jun. 9, 2020

(54) WASTE PROCESSING MACHINE WINCH DOCKING SAFETY SYSTEM

(71) Applicant: Bandit Industries, Inc., Remus, MI (US)

(72) Inventors: Timothy Ryan Walcutt, Remus, MI (US); Thomas Arthur Stickler, Remus, MI (US)

(73) Assignee: Bandit Industries, Inc., Remus, MI (US)

( * ) Notice: Subject to any disclaimer, the term of this patent is extended or adjusted under 35 U.S.C. 154(b) by 482 days.

(21) Appl. No.: 15/480,578

(22) Filed: Apr. 6, 2017

(65) Prior Publication Data

US 2017/0291176 A1 Oct. 12, 2017

Related U.S. Application Data (60) Provisional application No. 62/318,979, filed on Apr. 6, 2016, provisional application No. 62/319,006, filed on Apr. 6, 2016.

(51) Int. Cl.
    *B02C 25/00*      (2006.01)
    *B02C 18/00*      (2006.01)
    (Continued)

(52) U.S. Cl.
    CPC .............. *B02C 25/00* (2013.01); *A01G 3/002* (2013.01); *B02C 18/00* (2013.01);
    (Continued)

(58) Field of Classification Search
    CPC ..... B02C 23/02; B02C 25/00; B02C 18/0084; B02C 18/00; B02C 18/225;
    (Continued)

(56) References Cited

U.S. PATENT DOCUMENTS

| | | |
|---|---|---|
| 1,104,548 A | 6/1870 | Brady |
| 1,311,469 A | 7/1919 | Smith |

(Continued)

FOREIGN PATENT DOCUMENTS

| | | |
|---|---|---|
| AU | 4574502 A | 12/2002 |
| AU | 763881 B2 | 7/2003 |

(Continued)

OTHER PUBLICATIONS

Brush Bandit Catalog; Bandit Industries, Inc.; 32 pages (2010).

(Continued)

*Primary Examiner* — Omar Flores Sanchez
(74) *Attorney, Agent, or Firm* — Howard & Howard Attorneys PLLC (57) ABSTRACT

A waste processing machine for reducing material and having a docking safety system. A cutting assembly on a frame reduces material. A feed system on the frame directs material toward the cutting assembly. A winch assembly includes a line with a line end for securing material, and a driver on the frame to urge the line end toward the driver. A keeper fixed to the frame secures the line end to the frame. A docking subassembly, spaced from the keeper, is movable between: a docked position with the line tensioned against the subassembly between the driver and the line end secured to the keeper; and an undocked position with the line loosened against the subassembly. A control unit allows operation of the feed system when the subassembly is in the docked position, and at least partially limits operation of the feed system when the subassembly is in the undocked position.

21 Claims, 9 Drawing Sheets

(51) Int. Cl.
*B02C 18/22* (2006.01)
*A01G 3/00* (2006.01)
*B02C 23/02* (2006.01)
*B27L 11/02* (2006.01)
*B66D 1/48* (2006.01)
*B66D 1/56* (2006.01)

(52) U.S. Cl.
CPC ...... *B02C 18/0084* (2013.01); *B02C 18/2225* (2013.01); *B02C 23/02* (2013.01); *B27L 11/02* (2013.01); *B66D 1/485* (2013.01); *B66D 1/56* (2013.01); *B02C 2201/06* (2013.01)

(58) Field of Classification Search
CPC ... B02C 2201/06; B27L 11/02; B66D 1/7415; B66D 1/7489; B66D 1/485; B66D 1/56; A01G 23/003; A01G 3/002
See application file for complete search history.

(56) References Cited

U.S. PATENT DOCUMENTS

| | | | |
|---|---|---|---|
| 1,409,368 A | 3/1922 | Dudley | |
| 1,874,007 A * | 8/1932 | Heaton | B60P 1/483 414/469 |
| 1,987,688 A | 1/1935 | Lamb | |
| D104,548 S | 5/1937 | Brady | |
| 2,131,402 A * | 9/1938 | King | A01G 23/006 414/538 |
| 2,428,085 A | 9/1947 | Largen | |
| 2,487,305 A | 11/1949 | Bridegroom | |
| 2,542,952 A * | 2/1951 | White | A01G 23/091 30/372 |
| 3,029,848 A | 4/1962 | Bombardier | |
| 3,077,338 A | 2/1963 | Bergerson et al. | |
| 3,092,273 A | 6/1963 | Schramm | |
| 3,216,520 A | 11/1965 | Blonsky | |
| 3,275,046 A | 9/1966 | Moyers et al. | |
| 3,281,119 A | 10/1966 | Westfall | |
| 3,282,450 A | 11/1966 | Atcheson | |
| 3,340,912 A | 9/1967 | Williams et al. | |
| 3,424,326 A | 1/1969 | Thatcher | |
| 3,457,975 A | 7/1969 | Wehr et al. | |
| 3,515,185 A | 6/1970 | Wehr et al. | |
| 3,559,898 A | 2/1971 | Rinke | |
| 3,595,161 A | 7/1971 | Webb | |
| 3,630,243 A | 12/1971 | Hamilton et al. | |
| 3,642,041 A | 2/1972 | Hamilton et al. | |
| 3,777,375 A | 12/1973 | Smith | |
| 3,841,507 A * | 10/1974 | Barwise | B66C 3/16 414/569 |
| 3,844,489 A | 10/1974 | Strong | |
| 3,945,517 A | 3/1976 | Carley | |
| 3,989,198 A | 11/1976 | Blasko | |
| 4,076,061 A | 2/1978 | Greeninger | |
| 4,102,528 A | 7/1978 | Cripe | |
| 4,176,696 A | 12/1979 | Greeninger | |
| 4,238,116 A | 12/1980 | Plante et al. | |
| 4,315,652 A | 2/1982 | Barwise | |
| 4,338,985 A | 7/1982 | Smith et al. | |
| 4,365,927 A | 12/1982 | Schenck | |
| 4,390,132 A | 6/1983 | Hutson et al. | |
| 4,398,581 A | 8/1983 | Aikins et al. | |
| 4,529,350 A | 7/1985 | Jones | |
| 4,685,495 A | 8/1987 | Freeman | |
| 4,805,676 A * | 2/1989 | Aikins | B27B 25/02 144/195.1 |
| 4,898,221 A | 2/1990 | Eriksson | |
| RE33,233 E | 6/1990 | Freeman | |
| 5,010,933 A | 4/1991 | Doyle | |
| 5,088,532 A | 2/1992 | Eggers et al. | |
| 5,349,999 A | 9/1994 | Peterson et al. | |
| 5,362,004 A | 11/1994 | Bateman | |
| 5,372,316 A | 12/1994 | Bateman | |
| 5,413,286 A | 5/1995 | Bateman | |
| 5,692,548 A | 12/1997 | Bouwers et al. | |
| 5,692,549 A | 12/1997 | Eggers | |
| 5,769,586 A | 6/1998 | Schulte | |
| 5,863,003 A | 1/1999 | Smith | |
| 5,988,539 A | 11/1999 | Morey | |
| 6,000,642 A | 12/1999 | Morey | |
| 6,016,855 A | 1/2000 | Morey | |
| 6,032,707 A | 3/2000 | Morey et al. | |
| 6,036,125 A | 3/2000 | Morey et al. | |
| 6,047,912 A | 4/2000 | Smith | |
| 6,059,210 A | 5/2000 | Smith | |
| 6,076,572 A | 6/2000 | Cook | |
| 6,138,932 A | 10/2000 | Moore | |
| 6,138,991 A | 10/2000 | Myers, Jr. | |
| 6,299,082 B1 | 10/2001 | Smith | |
| 6,357,684 B1 | 3/2002 | Morey | |
| 6,446,889 B1 | 9/2002 | Moore | |
| 6,517,020 B1 | 2/2003 | Smith | |
| 6,572,039 B1 | 6/2003 | Kruer et al. | |
| 6,591,973 B2 | 7/2003 | Smith | |
| 6,600,642 B1 | 7/2003 | Karnes | |
| 6,722,596 B1 | 4/2004 | Morey | |
| 6,729,567 B1 | 5/2004 | Morey | |
| 6,804,871 B1 | 10/2004 | Smith | |
| 6,814,320 B1 | 11/2004 | Morey et al. | |
| 6,830,204 B1 | 12/2004 | Morey | |
| 6,845,931 B1 | 1/2005 | Smith | |
| 6,955,310 B1 * | 10/2005 | Morey | A01G 3/002 144/430 |
| 7,007,874 B1 | 3/2006 | Smith | |
| 7,011,124 B1 | 3/2006 | Morey | |
| 7,011,258 B2 | 3/2006 | O'Halloran et al. | |
| 7,040,558 B2 * | 5/2006 | Stelter | A01G 3/002 241/28 |
| 7,044,409 B2 | 5/2006 | Stelter et al. | |
| 7,063,306 B2 | 6/2006 | Sanders et al. | |
| 7,121,485 B2 | 10/2006 | Smith | |
| 7,121,488 B1 | 10/2006 | Marriott et al. | |
| 7,163,166 B1 | 1/2007 | Smith | |
| 7,384,011 B1 | 6/2008 | Smith | |
| 7,410,150 B1 * | 8/2008 | Falls | B66D 1/56 248/329 |
| 7,562,837 B2 * | 7/2009 | Brand | A01G 3/002 241/101.2 |
| 7,726,594 B2 | 6/2010 | Smith | |
| 7,819,348 B2 | 10/2010 | Bouwers et al. | |
| 8,109,303 B1 | 2/2012 | Holmes | |
| 8,584,718 B2 | 11/2013 | Holmes | |
| 9,233,375 B2 | 1/2016 | Kennedy et al. | |
| 9,636,687 B2 * | 5/2017 | Kennedy | B02C 25/00 |
| 9,656,269 B2 | 5/2017 | Kennedy et al. | |
| 2006/0196981 A1 | 9/2006 | Stelter et al. | |
| 2007/0001038 A1 * | 1/2007 | Bouwers | A01G 3/002 241/34 |
| 2007/0034295 A1 | 2/2007 | Chapman | |
| 2007/0104560 A1 | 5/2007 | Hall | |
| 2008/0296420 A1 * | 12/2008 | Brand | A01G 3/002 241/34 |
| 2009/0095828 A1 * | 4/2009 | Bouwers | A01G 3/002 241/64 |
| 2011/0062266 A1 | 3/2011 | Smith | |
| 2012/0043404 A1 | 2/2012 | Morey | |
| 2013/0025744 A1 | 1/2013 | Morey | |
| 2013/0026266 A1 | 1/2013 | Morey | |
| 2013/0334346 A1 | 12/2013 | Morey | |
| 2014/0138464 A1 | 5/2014 | Casper | |
| 2014/0163741 A1 | 6/2014 | Morey | |
| 2014/0263775 A1 * | 9/2014 | Satterwhite | B27L 11/002 241/28 |
| 2016/0030945 A1 | 2/2016 | Kennedy et al. | |
| 2016/0030946 A1 | 2/2016 | Kennedy et al. | |
| 2017/0043350 A1 * | 2/2017 | Beam, III | B02C 18/24 |
| 2017/0137266 A1 * | 5/2017 | Hoffend | B66D 1/26 |
| 2017/0291177 A1 | 10/2017 | Walcutt et al. | |

(56) References Cited

U.S. PATENT DOCUMENTS

| | | | | |
|---|---|---|---|---|
| 2018/0162703 A1* | 6/2018 | Codd | ................... | B66D 5/02 |
| 2019/0128379 A1* | 5/2019 | Hall | ................... | B66D 1/22 |

FOREIGN PATENT DOCUMENTS

| | | | |
|---|---|---|---|
| AU | 2009345114 | A1 | 11/2010 |
| CA | 2103633 | A1 | 3/1994 |
| CA | 2133119 | A1 | 4/1995 |
| CA | 2133120 | A1 | 4/1995 |
| CA | 2132942 | A1 | 3/1996 |
| CA | 2354106 | A1 | 8/1997 |
| CA | 2266176 | A1 | 11/1999 |
| CA | 2381889 | A1 | 12/2002 |
| CA | 2354105 | C | 11/2004 |
| CA | 2742211 | A1 | 11/2010 |
| DE | 3240385 | A1 | 5/1984 |
| DE | 4416195 | A1 | 11/1994 |
| EP | 1266692 | A3 | 9/2004 |
| EP | 1186345 | B1 | 3/2011 |
| EP | 2424673 | A1 | 3/2012 |
| EP | 1952888 | B1 | 8/2012 |
| JP | 2002177806 | A | 6/2002 |
| JP | 2003103193 | A | 4/2003 |
| SU | 674730 | A1 | 7/1979 |
| WO | 2010126541 | A1 | 11/2010 |
| WO | 2013013233 | A1 | 1/2013 |
| WO | 2013138480 | A1 | 9/2013 |
| WO | 2013188865 | A1 | 12/2013 |

OTHER PUBLICATIONS

Four Photos of Vermeer Prototype Chipper.
Bandit Model 150, 200+ & 250, The 12' Capacity Brush Disc-Style Chippers Brochure, Bandit Industries, Inc.; 4 pages (Jul. 1995).
Vermeer BC2000 Brush Chipper Brochure, Vermeer Manufacturing; 4 pages (1999).
English language abstract and computer-generated translation for JP2003103193 extracted from espacenet.com Sep. 21, 2017; 9 pages.
English language abstract and computer-generated translation for JP2002177806 extracted from espacenet.com database Sep. 21, 2017; 9 pages.
English language abstract and computer-generated translation for DE3240385 extracted from espacenet.com database Sep. 21, 2017; 4 pages.
English language astract for SU674730 not found; however, see computer-generated translation extracted from espacenet.com Oct. 5, 2017; 3 pages.
English language abstract and computer-generated translation for DE4416195 extracted from espacenet.com Sep. 21, 2017; 7 pages.

* cited by examiner

WASTE PROCESSING MACHINE WINCH DOCKING SAFETY SYSTEM

CROSS-REFERENCE TO RELATED APPLICATIONS

The subject patent application claims priority to and all the benefits of U.S. Provisional Patent Application Ser. No. 62/318,979 which was filed on Apr. 6, 2016, and U.S. Provisional Patent Application Ser. No. 62/319,006 which was filed on Apr. 6, 2016, the disclosures of which are hereby incorporated by reference.

BACKGROUND OF THE INVENTION

1. Field of the Invention

The present invention relates, generally, to waste processing machines and, more specifically, to a waste processing machine having a winch docking safety system.

2. Description of the Related Art

Conventional waste processing machines are employed to recycle, reduce, or otherwise process waste products or materials, such as bulk wood products, by chipping, cutting, grinding, or otherwise reducing the waste products. To this end, waste processing machines employ an infeed system to receive material to be reduced, such as wood products or tree limbs. A feed system with rotating feed wheels is employed to advance bulk material directed into the infeed system towards a cutting assembly. The cutting assembly, in turn, comprises a rotating disc or drum which is configured to reduce the bulk materials into chips. The chips are subsequently propelled out of a discharge chute arranged downstream of the cutting assembly.

In certain applications, the waste processing machine employs a winch assembly to help gather, secure, drag, lift, etc., the bulk products onto and into the infeed system for capture by the feed system of the waste processing machine. To this end, the winch assembly comprises a winch line and a winch driver to drag heavy bulk materials towards the infeed system.

Waste processing machines, and wood chippers in particular, are regularly utilized in a number of different industries. Those having ordinary skill in the art will appreciate that incorrect operation of waste processing machines can be potentially dangerous. Specifically, it will be appreciated that if proper procedures are not followed, it is possible for the winch line to be captured by the feed wheels of the feed system and/or by the disk or drum of the cutting assembly. Once captured, the winch line become entangled with or captured by the rotating disc or drum and consequently may be retracted. This retraction of the winch line may be too quick for an operator to react to and may cause safety issues. For example, retraction of the winch line can cause the winch line, and anything attached thereto, to be flung or whipped around, possibly causing damage or injury to nearby objects or operators. Further, if anything becomes entangled in the winch line, it may be pulled towards the waste processing machine.

Accordingly, while conventional waste processing machines have generally performed well for their intended use, there remains a need in the art for waste processing machines which are, among other things, relatively inexpensive to manufacture and operate, and which provide for increased safety and reliability when used in connection with winch lines.

SUMMARY OF THE INVENTION

The present invention overcomes the disadvantages in the prior art in a waste processing machine for reducing waste material and having a winch docking safety system. A frame is provided, and a cutting assembly is disposed on the frame for reducing waste material. A feed system is disposed on the frame for directing waste material toward the cutting assembly. A winch assembly is provided for selectively directing waste material toward the feed system. The winch assembly includes a winch line extending to a distal line end for securing waste material, and a winch driver coupled to the frame and in communication with the winch line to urge the line end toward the winch driver. A keeper is fixedly coupled to the frame and remains stationary relative to the frame to secure the line end to the frame. A docking subassembly, spaced from the keeper, is movable between a docked position and an undocked position. In the docked position, the winch line is tensioned against the docking subassembly between the winch driver and the line end, with the line end secured to the keeper. In the undocked position, the winch line is loosened against the docking subassembly. A control unit is provided in communication with the feed system and the docking subassembly to allow operation of the feed system when the docking subassembly is in the docked position, and to at least partially limit operation of the feed system when the docking subassembly is in the undocked position.

In this way, the waste processing machine winch docking safety system of the present invention affords opportunities for improved safety by preventing winch lines from inadvertently being captured by the feed system and/or cutting assembly that might otherwise pull objects towards the waste processing machine.

BRIEF DESCRIPTION OF THE DRAWINGS

Advantages of the present invention will be readily appreciated as the same becomes better understood after reading the subsequent description taken in connection with the accompanying drawings.

DETAILED DESCRIPTION OF THE INVENTION

Figure 1A:
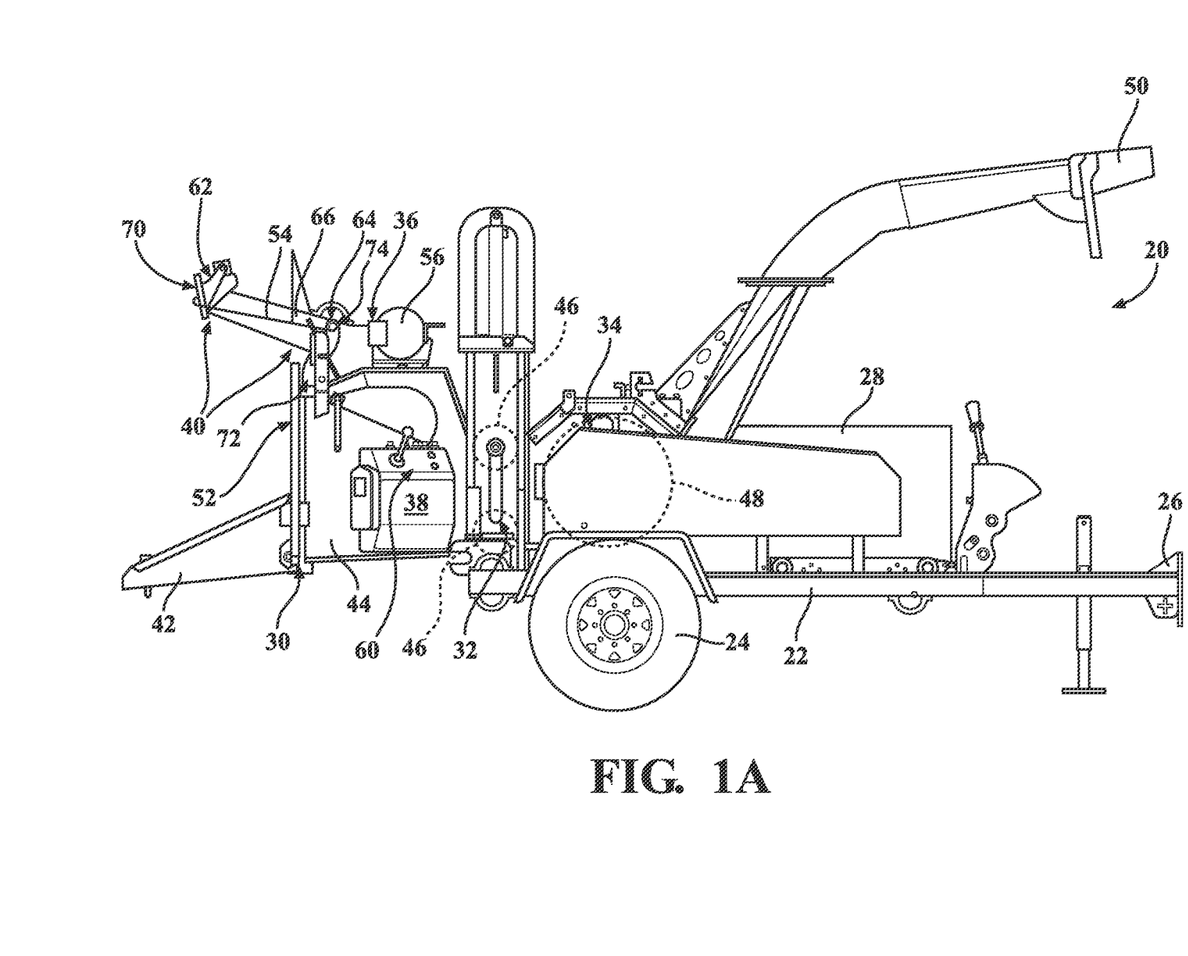
FIG. 1A is a side view of a waste processing machine having a winch docking safety system according to one embodiment of the present invention.
Figure 1B:
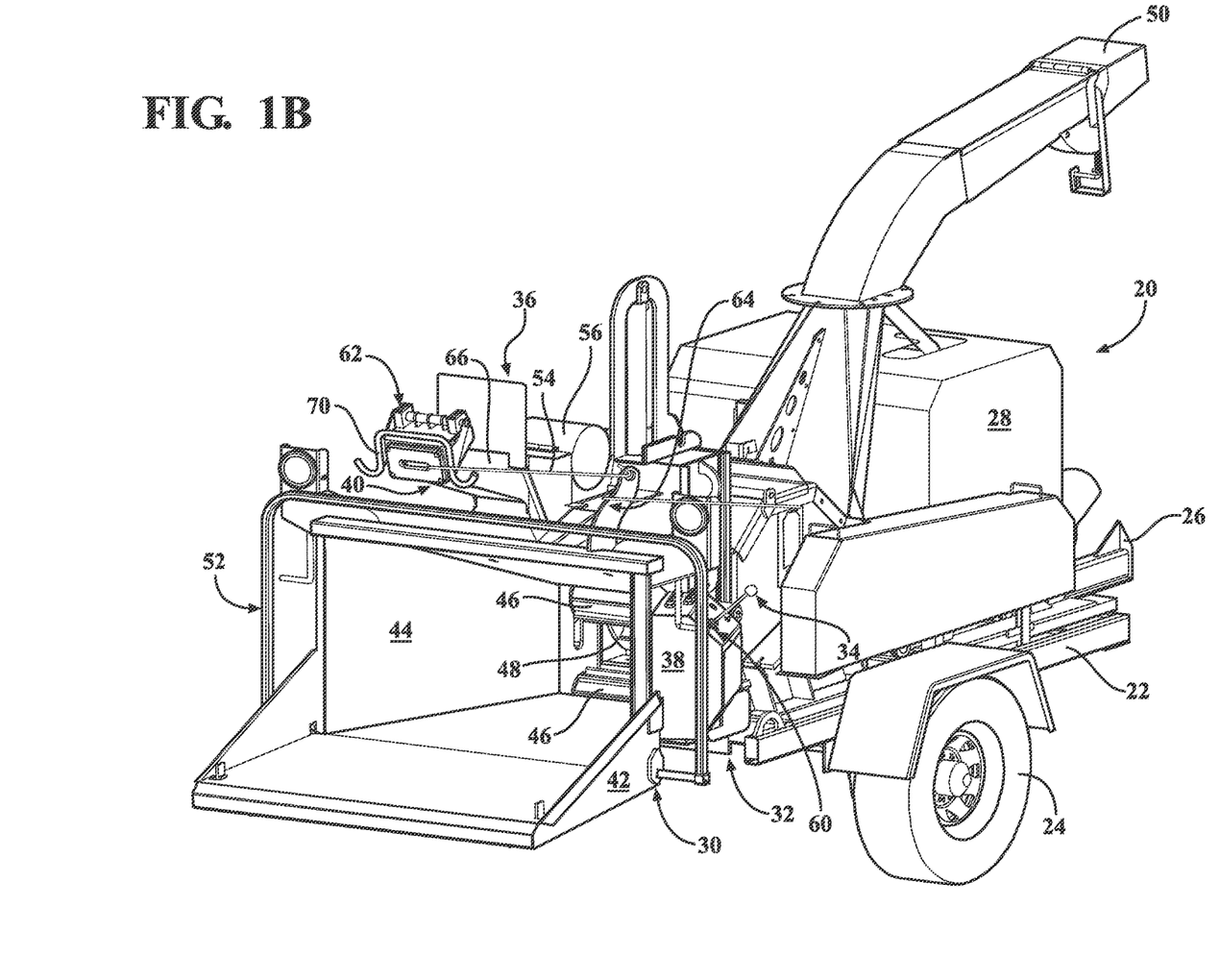
FIG. 1B is a perspective view of the waste processing machine of FIG. 1A.

With reference to the Figures, where like numerals are used to designate like structure throughout the several views, a waste processing machine according to one embodiment of the present invention is depicted at 20 in FIGS. 1A-1B. The waste processing machine 20 recycles, reduces, or otherwise processes products, such as bulk wood products, by chipping, cutting, grinding, or otherwise reducing the waste products. In the representative embodiment illustrated herein, the waste processing machine 20 is realized as a wood chipper. However, those having ordinary skill in the art will appreciate that the waste processing machine 20 could be of any suitable type or configuration sufficient to chip, grind, cut, or otherwise reduce bulk products or materials, without departing from the scope of the present invention.

Conventional waste processing machines 20, and wood chippers in particular, are regularly utilized in various industries. Those having ordinary skill in the art will appreciate that incorrect operation of waste processing machines 20 can be potentially dangerous. Accordingly, while conventional waste processing machines 20 have generally performed well for their intended use, there remains a need in the art waste processing machines 20 which are, among other things, relatively inexpensive to manufacture and operate, which provide for increased safety and reliability, and which are easily, automatically, and/or passively operable.

As noted above, the waste processing machine 20 depicted in FIGS. 1A-1B is realized as a mobile wood chipper with a frame 22 supported by a pair of wheels 24. A conventional trailer hitch 26 operatively attached to the frame 22 allows the waste processing machine 20 to be towed by a vehicle (not shown). The frame 22 generally supports a power source 28, an infeed system 30, a feed system 32, a cutting assembly 34, a winch assembly 36, a control unit 38, and a winch docking safety system 40. Each of these components, systems, and assemblies will be described in greater detail below.

As noted above, the waste processing machine 20 depicted in FIGS. 1A-1B is configured so as to be transportable, such as by a vehicle. However, those having ordinary skill in the art will appreciate that the waste processing machine 20 could be configured in a number of different ways without departing from the scope of the present invention. By way of non-limiting example, the waste processing machine 20 could be stationary, could be implemented onto a vehicle, or could be supported on or otherwise moveable along a track.

The power source 28 is configured to provide a source of rotational torque which is used to drive the feed system 32 and the cutting assembly 34. To this end, the power source 28 may be realized as one or more internal combustion engines configured to translate rotational torque to certain components or systems of the waste processing machine 20, such as to the cutting assembly 34 and also to a hydraulic pump assembly which, in turn, may be used to drive certain components or systems (not shown). It will be appreciated that the power source 28 could be arranged or otherwise configured in any suitable way without departing from the scope of the present invention. By way of non-limiting example, the power source 28 could utilize or otherwise be realized by one or more electric motors, engines, generators, pump assemblies, hydraulic drives, and the like.

The infeed system 30 is employed to facilitate directing material, such as wood products or tree limbs, to the feed system 32 which, in turn, directs the material to the cutting assembly 34 to reduce the material. To this end, the infeed system 30 includes an infeed tray 42 and an infeed hopper 44 arranged to direct material into the feed system 32. Certain materials, such as relatively small branches or tree limbs, can be inserted directly into the infeed hopper 44 towards the feed system 32. Other materials, such as relatively larger branches or tree limbs, can be supported first on the infeed tray 42 and then inserted into the infeed hopper 44 and moved towards the feed system 32. As described in greater detail below, the winch assembly 36 is used to pull particularly large or heavy materials onto the infeed tray 42 and into the infeed hopper 44 under certain operating conditions.

The feed system 32 is interposed between the infeed system 30 and the cutting assembly 34 and employs one or more feed wheels 46 (depicted schematically in FIG. 1A) arranged to pull materials inserted into the infeed hopper 44 towards cutting assembly 34. Here, the cutting assembly 34 is arranged in communication with the feed system 32 and includes a rotor 48 (depicted schematically in FIG. 1A), such as a rotating disc or drum, configured to reduce materials into chips which are propelled out of a discharge chute 50 arranged downstream of the cutting assembly 34. The rotor 48 of the cutting assembly 34 can be in the form of a drum for drum-style chippers, or in the form of a disc for disc-style chippers. The Applicant has described one type of feed system 32 and cutting assembly 34 from a drum-style chipper in published U.S. patent application Ser. No. 14/233,869, the disclosure of which is hereby incorporated by reference. However, those having ordinary skill in the art will appreciate that the feed system 32 could be configured in any suitable way sufficient to direct materials towards the cutting assembly 34 without departing from the scope of the present invention. Similarly, it will be appreciated that the cutting assembly 34 could be configured in any suitable way sufficient to reduce materials from the feed system 32.

As noted above, the cutting assembly 34 is driven by the power source 28 which may be throttled or otherwise controlled so as to drive the rotor 48 of the cutting assembly 34 at a predetermined rotational speed. Here, a clutch, transmission, and/or geartrain may be interposed between the power source 28 and the cutting assembly 34 to modulate or interrupt torque translation therebetween (not shown, but generally known in the art). The feed system 32 is likewise driven by the power source 28 and is generally controlled independently of the cutting assembly 34 using hydraulics (not shown, but generally known in the art). In the representative embodiment illustrated herein, a control bar, generally indicated at 52, is employed to facilitate control of the feed system 32 whereby the operator can move the control bar 52 so as to effect rotation of the feed wheels 46 in predetermined ways, such as forward, stop, and reverse. Here, the rotor 48 of the cutting assembly 34 generally rotates at a relatively high velocity, and the feed wheels 46 of the feed system 32 generally rotate relatively slowly. In operation, material directed into the infeed system 30 is captured between the opposed, rotating feed wheels 46 of the feed system 32 which direct, pull, or otherwise cause those materials to move towards the cutting assembly 34 where they encounter the rotor 48 of the cutting assembly 34 and are reduced into chips which are expelled through the discharge chute 50.

As noted above, the winch assembly 36 cooperates with the infeed system 30 to direct waste materials towards the feed system 32. To that end, the winch assembly 36 includes a winch line 54 which is tensioned using a winch driver, generally indicated at 56. The winch driver 56 is coupled to the frame 22 and is adapted for control by an operator of the waste processing machine 20. The winch line 54 extends from the winch driver 56 to a distal line end 58 (see also FIGS. 2A-2B). The line end 58 is provided for securing waste material, and the winch driver 56 is configured to urge the line end 58 towards the winch driver 56, and to allow the line end 58 to be selectively moved away from the winch driver 56. To this end, in one embodiment, the winch assembly 36 comprises a winch control interface 60 adapted for actuation by an operator. Here, an operator of the waste processing machine 20 can use the winch control interface 60 to control the winch assembly 36 to, for example, pull the line end 58 towards the waste processing machine 20 via the winch driver 56, "free spool" or otherwise release tension in the winch line 54, and the like. It will be appreciated that the winch control interface 60 may be disposed in communication with the control unit 38, and may comprise one or more levers, buttons, inputs, and the like adapted for actuation by an operator.

The winch line 54 (sometimes referred to in the related art as a "cable," "rope," or "line") is generally used to gather, secure, drag, lift, etc., large or bulky materials onto the infeed tray 42 and into the infeed system 30 for capture by the feed system 32. As the winch assembly 36 is utilized, if proper procedures are not followed, it is possible for the line end 58 or another portion of the winch line 54 to be captured by one or more of the feed wheels 46 of the feed system 32 and/or by the rotor 48 of the cutting assembly 34, whereby the winch line 54 could become quickly entangled with or captured by the rotating rotor 48 of the cutting assembly 34 and consequently retracted into the cutting assembly 34. As such, retraction of the winch line 54 may be too quick for an operator to react to and may cause safety issues. For example, rapid retraction of the winch line 54 may cause the line end 58, and anything attached thereto, to be flung or whipped around, possibly causing damage or injury. Further, anything encompassed by or entangled with the winch line 54 could be pulled towards the waste processing machine 20 if the line end 58 and/or a portion of the winch line 54 were to be captured by the rotor 48.

Figure 6:
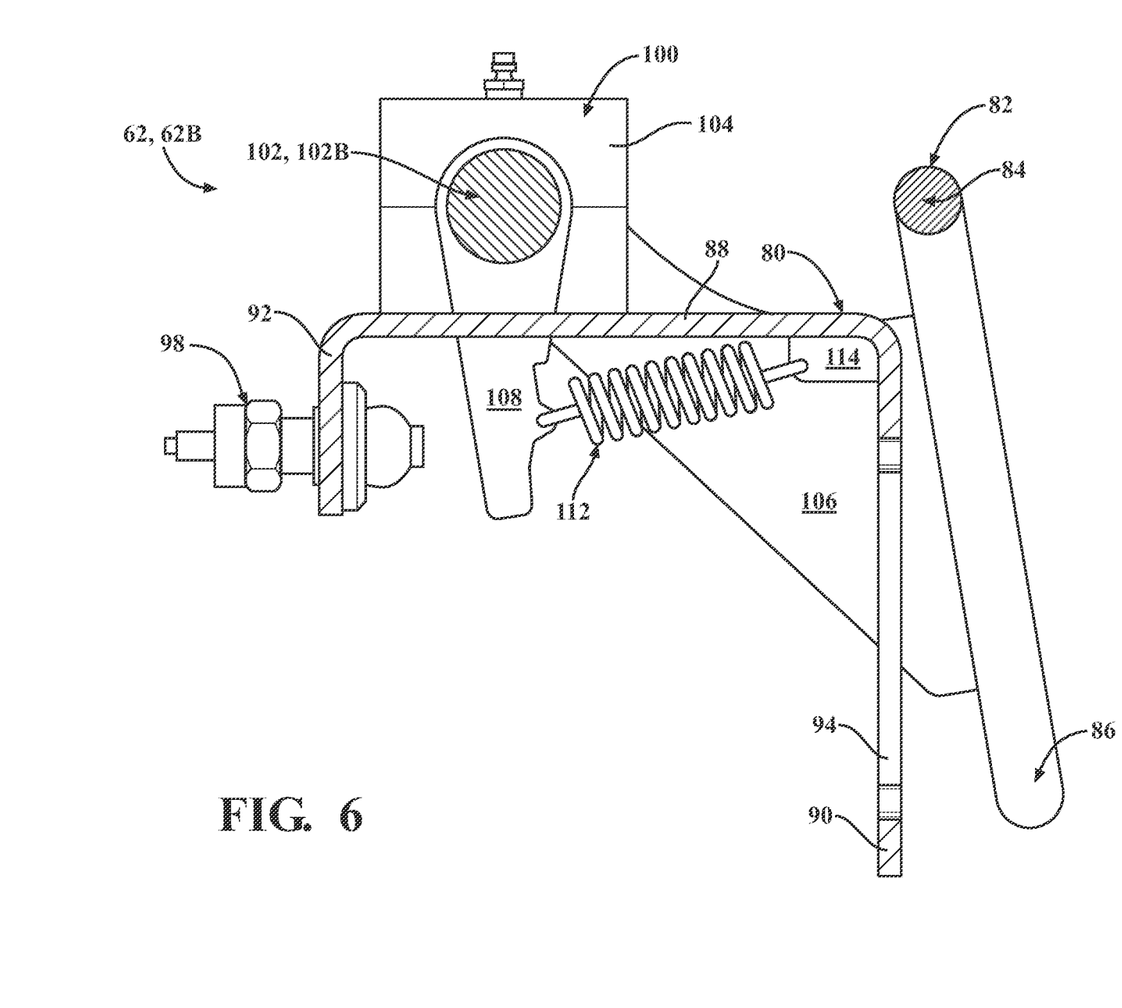
FIG. 6 is a sectional view taken along line 6-6 of FIG. 5 showing the docking subassembly in the undocked position depicted in FIG. 2B.
Figure 7:
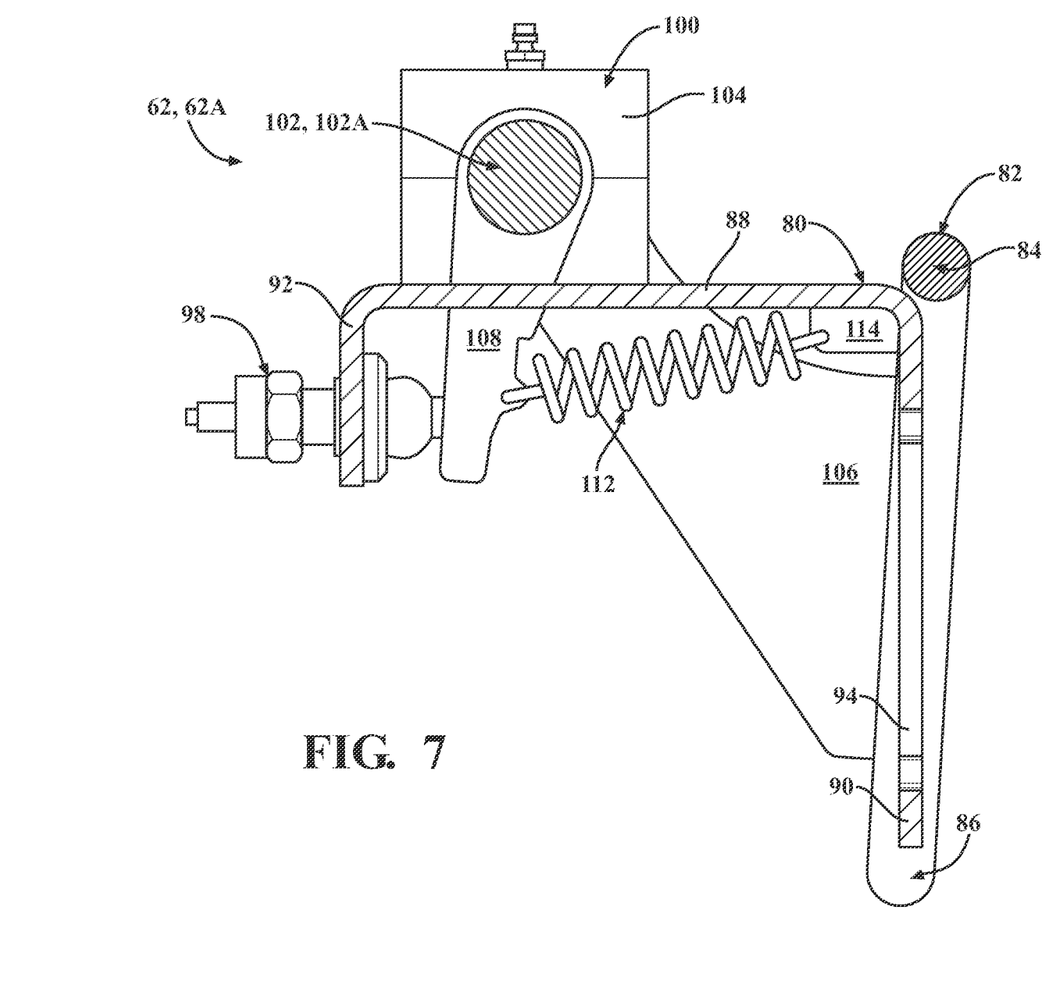
FIG. 7 is an alternate cross-sectional view of the docking subassembly depicted in FIG. 6 showing the docking subassembly in the docked position depicted in FIG. 2A.

The winch docking safety system 40 of the present invention is implemented in order to ensure safe operation of the waste processing machine 20 and to prevent retraction of the winch line 54, as described above. To these ends, the winch docking safety system 40 includes a docking subassembly, generally indicated at 62, and a keeper 64. The keeper 64 is fixedly coupled to the frame 22, remains stationary relative to the frame 22, and is provided to secure the line end 58 to the frame 22. The docking subassembly 62 is spaced from the keeper 64 (see FIGS. 1A-2B) and, as is described in greater detail below in connection with FIGS. 6 and 7, is movable between: a docked position 62A (see FIG. 7) with the winch line 54 tensioned against the docking subassembly 62 between the winch driver 56 and the line end 58 with the line end 58 secured to the keeper 64 (see FIG. 2A); and an undocked position 62B (see FIG. 6; compare with FIG. 7) with the winch line 54 loosened against the docking subassembly 62 (see FIG. 2B; compare with FIG. 2A). Those having ordinary skill in the art will appreciate that use of the terms "loose" and/or "loosened" herein can be used to describe any suitable configuration where the winch line 54 is not otherwise tensioned between the winch driver 56 and the keeper 64. By way of non-limiting example, while FIG. 2B depicts the winch line 54 loosened with the line end 58 secured to the keeper 54, the winch line 54 can also be considered to be loosened when the line end 58 is removed from the keeper 54.

The control unit 38 is in communication with the feed system 32 and the docking subassembly 62, allows operation of the feed system 32 when the docking subassembly 62 is in the docked position 62A, and at least partially limits operation of the feed system 32 when the docking subassembly 62 is in the undocked position 62B. Thus, the winch docking safety system 40 can limit, restrict, or otherwise prevent operation of the feed system 32 during operation of the winch assembly 36, such as when the line end 58 is being used to direct materials to the infeed system 30. The docking subassembly 62, the keeper 64, and the control unit 38 will each be described in greater detail below.

As shown in FIGS. 1A-1B, the docking subassembly 62 is arranged vertically above the infeed tray 42 and is supported by a boom 66 which extends from the winch driver 56 to a boom end 68, and the docking subassembly 62 is operatively attached to the boom 66 adjacent to the boom end 68. Here, the winch line 54 extends from the winch driver 56, through the boom 66, through the docking subassembly 62, and out of a guide 70 operatively attached to the docking subassembly 62 which is configured to prevent the line end 58 from entering into the boom 66 (see FIGS. 2A-2B). In the representative embodiment illustrated herein, the guide 70 is employed as a fairlead and has a hawse configuration. However, those having ordinary skill in the art will appreciate that the guide 70 could be configured in any suitable way without departing from the scope of the present invention. By way of non-limiting example, the guide 70 could incorporate a roller assembly (not shown, but generally known in the art).

In the representative embodiment illustrated in FIGS. 1A-1B, the docking subassembly 62 is positioned longitudinally further away from the feed system 32 than the keeper 64 is. In addition, the keeper 64 is positioned vertically lower than the docking subassembly 62. This configuration helps to prevent the winch line 54 from engaging the docking subassembly 62 when the winch assembly 36 is being utilized and ensures that the winch line 54 properly engages the docking subassembly 62 when the line end 58 is secured to the keeper 64, as described in greater detail below. However, those having ordinary skill in the art will appreciate that the docking subassembly 62 could be positioned in any suitable location spaced from the keeper 64 sufficient to effect movement from the undocked position 62B to the docked position 62A in response to engagement with the tensioned winch line 54 where the line end 58 is secured to the keeper 64, as noted above. By way of non-limiting example, the docking subassembly 62 could be operatively attached to another portion of the waste processing machine 20 besides the boom 66, such as to the infeed hopper 44. Other arrangements are contemplated herein.

Figure 2A:
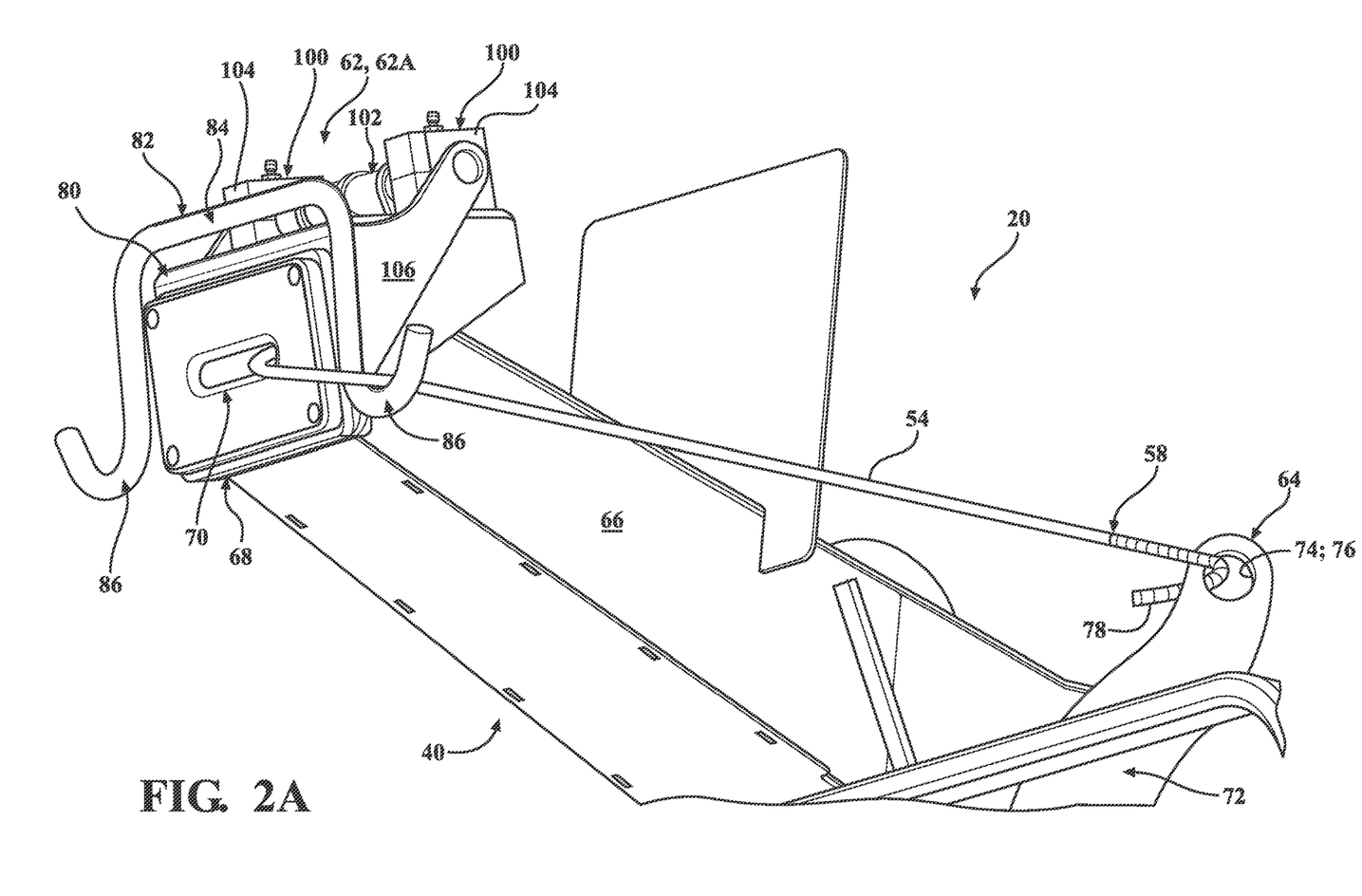
FIG. 2A is a partial perspective view of the waste processing machine and the winch docking safety system of FIGS. 1A-1B shown in a docked position with a winch line secured to a keeper and tensioned against a hanger of a docking subassembly.
Figure 2B:
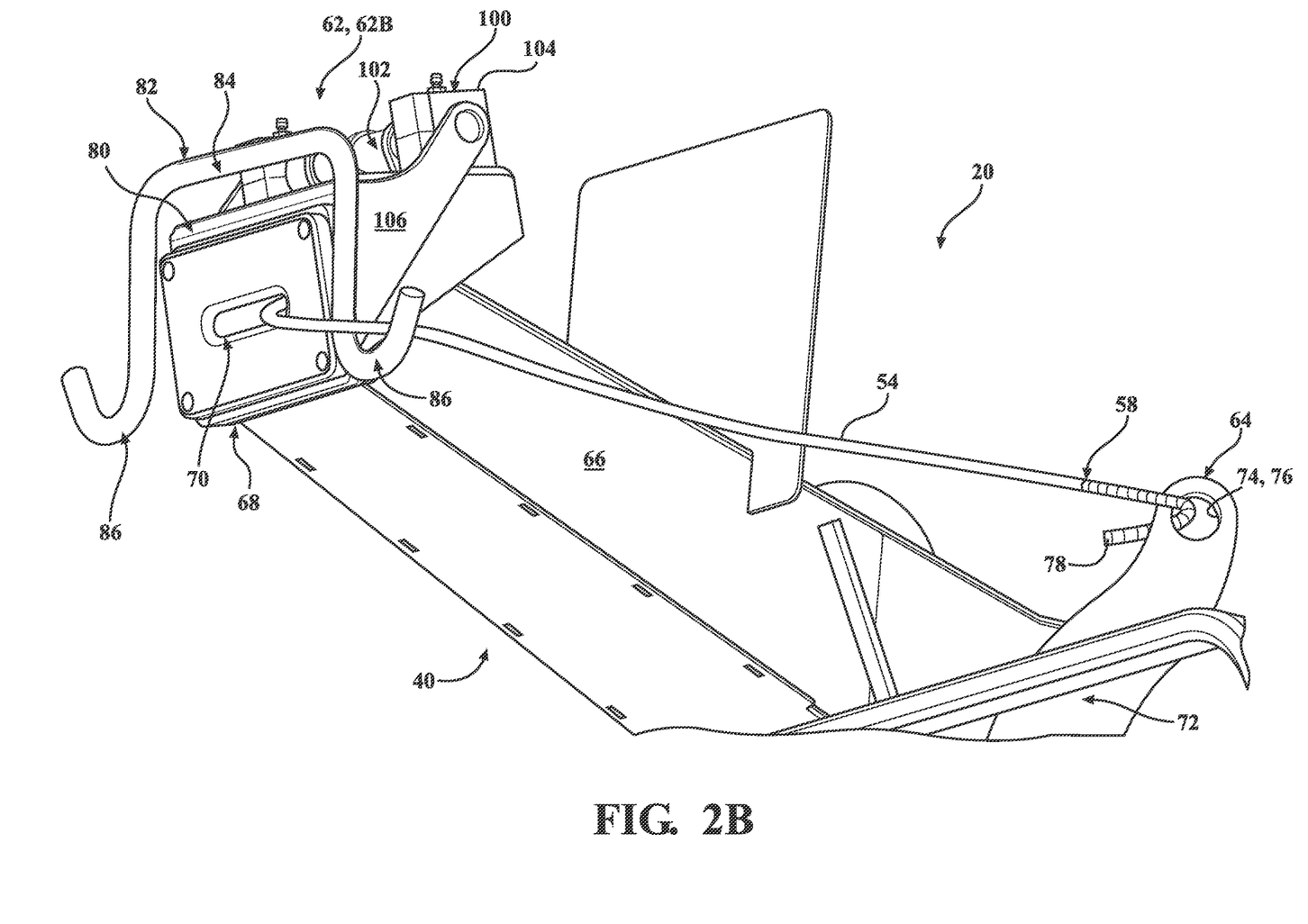
FIG. 2B is another partial perspective view of the waste processing machine and the winch docking safety system of FIGS. 1A-1B shown in an undocked position with the winch line loosened.

Referring now to FIGS. 2A-2B, as noted above, the keeper 64 of the winch docking safety system 40 is configured to releasably secure the line end 58 of the winch line 54. To this end, in one embodiment, the keeper 64 comprises a keeper mount 72 operatively attached to the frame 22, and a receiver 74 spaced from the keeper mount 72 to secure the line end 58 of the winch line 54. Those having ordinary skill in the art will appreciate that the keeper 64, the keeper mount 72, and the receiver 74 can be configured, shaped, or arranged in any suitable way sufficient to rigidly attach to the frame 22 and secure the line end 58. By way of non-limiting example, the keeper mount 72 can be rigidly attached to the frame 22, or to another component which is rigidly attached to the frame 22, via welding, fasteners, and the like. In the representative embodiment illustrated herein, the keeper mount 72 is welded to a portion of the infeed hopper 44 which, in turn, is rigidly fixed to the frame 22. Here, while the keeper 64 is depicted throughout the drawings as being formed as a discrete component, it will be appreciated that the keeper 64 could be formed integrally with another part of the waste processing machine 20 without departing from the scope of the present invention.

In the representative embodiment illustrated in FIGS. 2A-2B, the receiver 74 of the keeper 64 is realized as an aperture 76 which is formed in the keeper 64 and receives the line end 58 of the winch line 54. Here in this embodiment, a hook 78 is operatively attached to the line end 58 and is configured to engage in the aperture 76 of the keeper 64 so as to facilitate tensioning the winch line 54 against the docking subassembly 62 to move to the docked position 62A. However, those having ordinary skill in the art will appreciate that the line end 58 could be configured in a number of different ways sufficient to secure to the keeper 64, with or without the use of a hook 78, without departing from the scope of the present invention. By way of non-limiting example, the line end 58 could employ a loop and/or a "choker" with a chain and hook section (not shown, but generally known in the related art). Similarly, while the keeper 64 employs the aperture 76 to receive the hook 78, it will be appreciated that the keeper 64 could similarly be configured in any suitable way sufficient to engage the line end 58 of the winch line 54, without departing from the scope of the present invention. By way of non-limiting example, the keeper 64 could be provided with a keeper mount 72 that has a hook-shaped configuration to receive a line end 58 provided with a loop (not shown).

Figure 3:
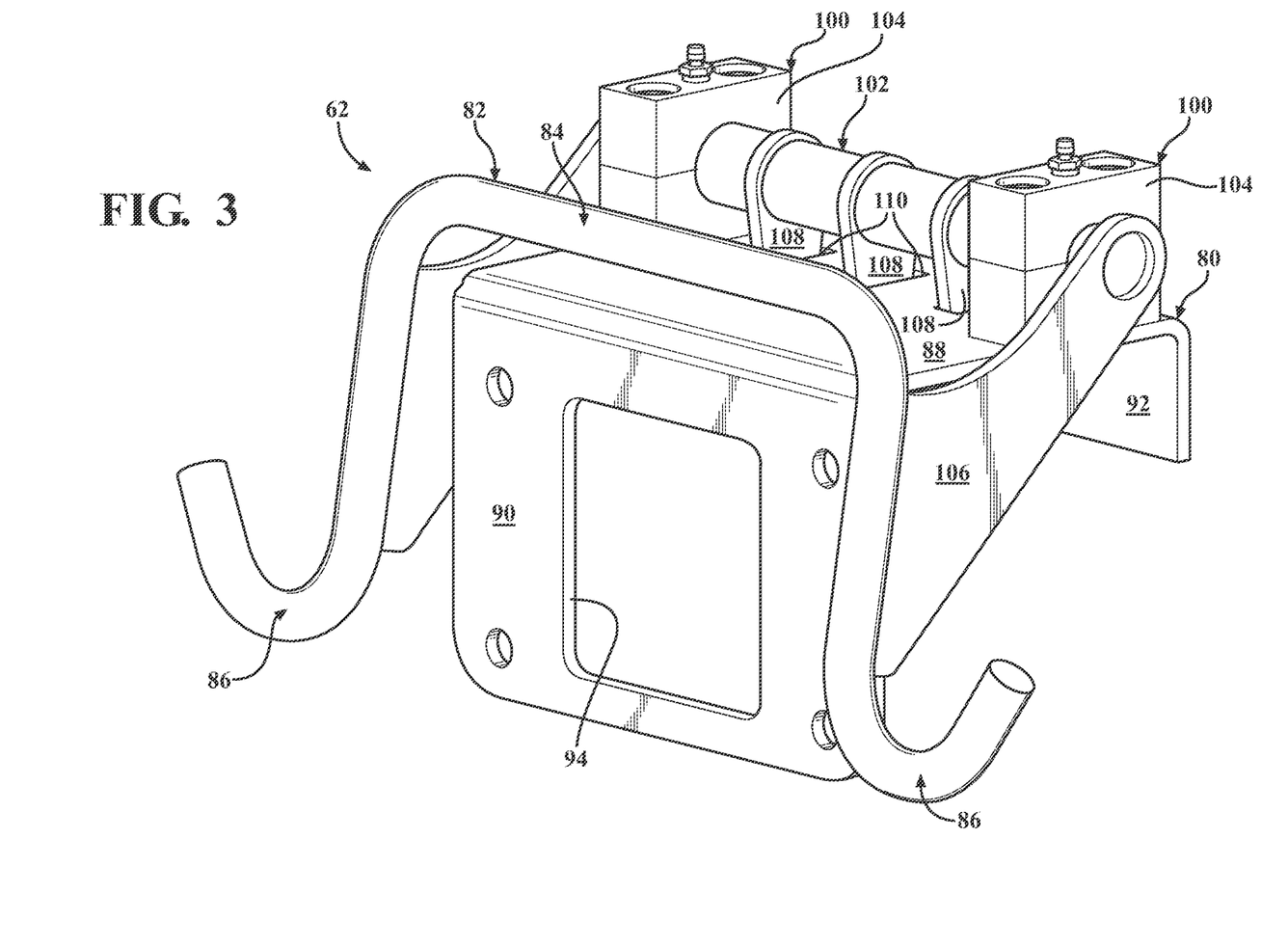
FIG. 3 is a perspective view of the docking subassembly of FIGS. 2A-2B.

Referring now to FIGS. 2A-7, in one embodiment, the docking subassembly 62 includes a base 80 operatively attached to the frame 22, and a hanger 82 coupled to the base 80 and arranged for movement relative to the base 80 between the docked position 62A (see FIG. 7) and the undocked position 62B (see FIG. 6). As is best depicted in FIG. 2A, at least a portion of the winch line 54 engages against the hanger 82 when in the docked position 62A. As shown in FIG. 3, the hanger 82 has a generally U-shaped central portion 84 and a pair of generally C-shaped catch portions 86. The catch portions 86 are each shaped to receive the winch line 54 in the docked position 62A (see FIG. 2A). Those having ordinary skill in the art will appreciate that the hanger 82 could be configured with a single catch portion 86. In the representative embodiment illustrated herein, the hanger 82 is formed a unitary, one-piece component with a cylindrical cross-sectional profile which is formed (for example, by bending) so as to define the central portion 84 and the catch portions 86. However, those having ordinary skill in the art will appreciate that the hanger 82 could be of any suitable shape, configuration, or orientation sufficient to engage the winch line 54 in the docked position 62A.

The base 80 of the docking subassembly 62 is configured to secure to the waste processing machine 20, such as to the boom end 68 of the boom 66, and has a generally U-shaped profile defined by a base plate 88 from which a guide plate 90 and a sensor plate 92 extend (see FIGS. 3, 6, and 7). The guide plate 90 has a passage 94 defined therein through which the winch line 54 passes adjacent to the guide 70 (see FIG. 2A). The sensor plate 92 has a sensor hole 96 defined therethrough for receiving a docking sensor, generally indicated at 98. As described in greater detail below, the docking sensor 98 is disposed in communication with the control unit 38 to detect movement between the docked position 62A and the undocked position 62B.

In one embodiment, the docking subassembly 62 includes a bearing assembly, generally indicated at 100, and a shaft 102 which is rotatably supported by the bearing assembly 100. Here, the shaft 102 is coupled to the hanger 82 such that movement of the hanger 82 between the docked position 62A and the undocked position 62B causes corresponding rotation of the shaft 102 between a docked radial position 102A (see FIG. 7) and an undocked radial position 102B (see FIG. 6). To this end, in one embodiment, the bearing assembly 100 comprises a pair of bearing blocks 104 which cooperate to rotatably support the shaft 102 for rotation between the radial positions 102A, 102B. As is best depicted in FIG. 3, the bearing blocks 104 are operatively attached to the base plate 88 adjacent to the sensor plate 92.

Referring now to FIGS. 3-7, in one embodiment, the docking subassembly 62 comprises at least one arm 106 extending between the shaft 102 and the hanger 82. Here, a pair of arms 106 are provided at opposing ends of the shaft 102 and each connects to the hanger 82 on opposing sides of the U-shaped central portion 84. The arms 106 are shaped so as to help position the hanger 82 relative to the shaft 102 and provide mechanical advantage while translating movement of the hanger 82 between the positions 62A, 62B into rotation of the shaft 102 between the radial positions 102A, 102B. In the representative embodiment illustrated herein, the docking subassembly 62 also comprises at least one cam member 108 fixed to the shaft 102 for concurrent movement between the radial positions 102A, 102B as the docking subassembly 62 moves between the positions 62A, 62B.

Figure 4:
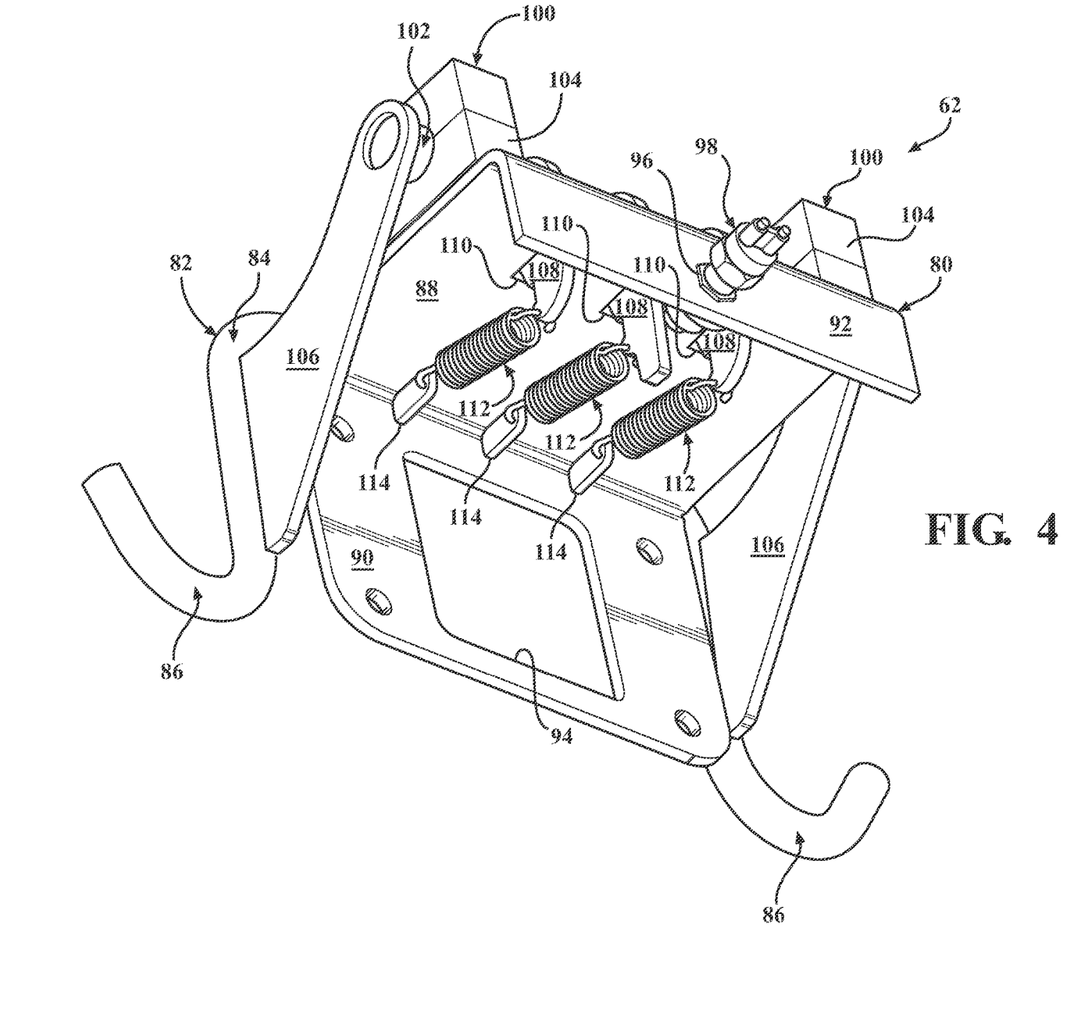
FIG. 4 is a rotated perspective view of the docking subassembly of FIG. 3.
Figure 5:
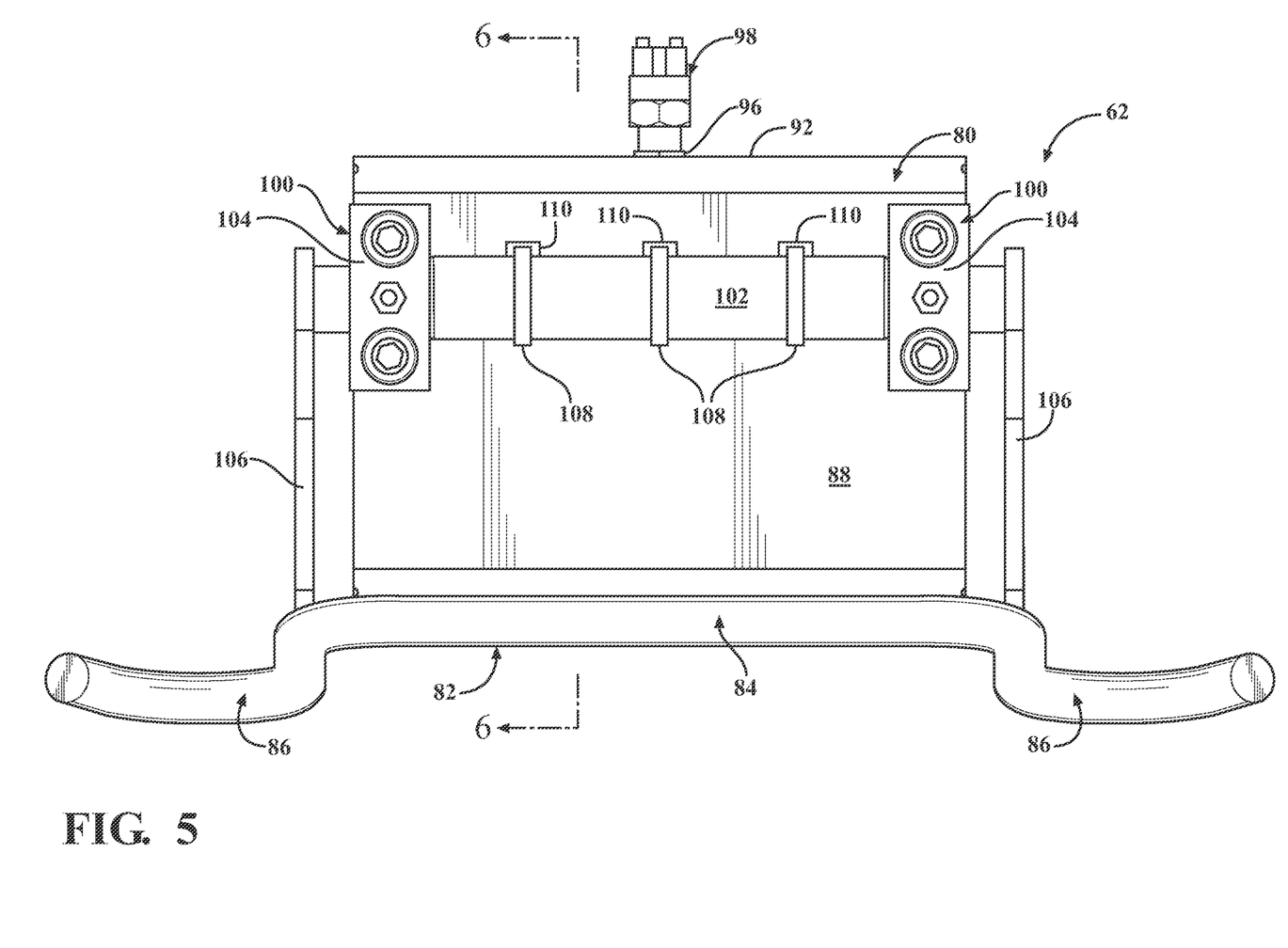
FIG. 5 is a top view of the docking subassembly of FIGS. 3 and 4.

As shown in FIG. 4, three cam members 108 are attached to the shaft 102 and are disposed in spaced relation between the arms 106. The cam members 108 each pass through respective slots 110 defined in the base plate 88 of the base 80 adjacent to the sensor plate 92, with one of the cam members 108 being arranged so as to engage the docking sensor 98, in the docked radial position 102A (see FIG. 7), as explained in greater detail below. In the illustrated embodiment, the docking subassembly 62 further comprises a biasing element 112 interposed between the base 80 and at least one of the cam members 108 to urge the shaft 102 away from the docked radial position 102A (see FIG. 7) and toward the undocked radial position 102B (see FIG. 6). This configuration helps ensure that the control unit 38 is able to interrupt operation of the feed system 32 as soon as the docking subassembly 62 moves from the docked position 62A to the undocked position 62B.

As is best shown in FIG. 4, in the representative embodiment illustrated herein, three biasing elements 112 realized as extension springs are provided; one attached to each of the respective three cam members 108 and also to a respective spring mount 114 fixed to the base 80 adjacent to the guide plate 90. However, those having ordinary skill in the art will appreciate that the winch docking safety system 40 can include any suitable number of biasing elements 112, of any suitable type, configuration, or arrangement sufficient to urge the docking subassembly 62 toward the undocked position 62B, without departing from the scope of the present invention.

The biasing elements 112 urge the cam members 108 towards the guide plate 90 of the base 80 and away from the docking sensor 98 when the winch assembly 36 is being utilized. Here, when the winch line 54 is out of engagement with the hanger 82 of the docking subassembly 62 while in the undocked position 62B, the docking sensor 98 remains spaced from the cam members 108 (see FIG. 6). Conversely, when the winch line 54 engages against the hanger 82 of the docking subassembly 62 while in the docked position 62A, the docking sensor 98 comes into engagement with one of the cam members 108 (see FIG. 7). In some embodiments, the biasing elements 112 are configured and arranged to exert enough force to ensure that the docking subassembly 62 cannot be manually bypassed, such as by an operator pushing on the hanger 82 to move the cam member 108 into engagement with the docking sensor 98. Likewise, the docking sensor 98 can advantageously be shielded or otherwise positioned so as to inhibit access by an operator.

In the representative embodiment illustrated herein, the docking sensor 98 comprises a limit switch disposed in electrical communication with the control unit 38 which is responsive to changes in between the positions 62A, 62B of the docking subassembly 62 based on physical contact with one of the cam members 108. However, those having ordinary skill in the art will appreciate that the docking sensor 98 could be of any suitable type or configuration sufficient to determine movement of the docking subassembly 62 between the positions 62A, 62B. By way of non-limiting example, the docking sensor 98 could be a proximity sensor or switch, a hall-effect sensor, a rotary encoder disposed in communication with the shaft 102, and the like.

As noted above, the control unit 38 is disposed in communication with the feed system 32 and the docking subassembly 62 and is configured to allow operation of the feed system 32 in the docked position 62A and to at least partially limit operation of the feed system 32 in the undocked position 62B. To these ends, it will be appreciated that the control unit 38 can be configured in a number of different ways, and from a number of different types and arrangements of components, depending on application requirements and the specific configuration of the waste processing machine 20.

By way of non-limiting example, where the waste processing machine 20 employs hydraulic fluid pressure to operate the feed system 32 and/or the winch driver 56, the control unit 38 could comprise an arrangement of hydraulic valves, solenoids, switches, and the like which cooperate to detect movement to the undocked position 62B and at least partially limit operation of the feed system 32 in response. Specifically, it is conceivable that the docking sensor 98 could be implemented as a physically-actuated hydraulic valve configured to alter fluid flow to a hydraulic drive employed to rotate the feed wheels 46 of the feed system 32 (not shown). Thus, it will be appreciated that communication between the control unit 38, the feed system 32, the winch assembly 36, and/or the docking subassembly 62 can be at least partially defined by hydraulic communication, based such as on fluid flow, pressure, volume, temperature, and the like.

By way of further non-limiting example, the control unit 38 could also comprise various electrical components, such as microcontrollers, electronic switches, sensors, engine controllers (for example, to communicate with the power source 28), and the like which cooperate to detect movement to the undocked position 62B and at least partially limit operation of the feed system 32 in response. Specifically, it is conceivable that the docking sensor 98 could be implemented as a physically-actuated electronic switch configured to generate a signal communicated to a microcontroller which, in turn, is configured to drive an electrically-actuated hydraulic solenoid to alter fluid flow to a hydraulic drive employed to rotate the feed wheels 46 of the feed system 32 (not shown). Thus, it will be appreciated that communication between the control unit 38, the feed system 32, the winch assembly 36, and/or the docking subassembly 62 can be at least partially defined by electrical communication, based such as on voltage, current, resistance, impedance, signal generation, sensor data, and the like.

Those having ordinary skill in the art will appreciate that the control unit 38 may include or otherwise be realized by any suitable number of electrical, mechanical, or hydraulic systems or components which cooperate to limit operation of the feed system 32 when the docking subassembly 62 is in the undocked position 62B. Furthermore, it will be appreciated that the docking subassembly 62 of the winch docking safety system 40 can likewise be configured in a number of different ways, and from a number of different components sufficient to be spaced from the keeper 64 and to determine movement between the positions 62A, 62B, as noted above When the waste processing machine 20 is utilized to reduce waste materials during operation, the line end 58 of the winch line 54 is secured to the keeper 64 and the winch line 54 is tightened between the winch driver 56 and the line end 58 such that the docking subassembly 62 is in the docked position 62A (see FIGS. 2 and 7). Here, the control unit 38 allows an operator to drive the feed system 32, such as via the control bar 52, to control how waste materials are directed toward and/or away from the cutting assembly 34. When the operator decides to utilize the winch assembly 36, such as to move a large tree limb into the infeed hopper 44, tension is released in the winch line 54 between the keeper 64 and the winch driver 56, such as by the operator actuating the winch control interface 60 to "free spool" or otherwise promote movement of the winch line 54 which allows the line end 58 to be moved with respect to the winch driver 56.

When tension is released in the winch line 54, the docking subassembly 62 moves from the docked position 62A (see FIG. 7) to the undocked position 62B (see FIG. 6). Here, stored energy in the biasing elements 112 urges the docking subassembly 62 to the undocked position 62 as soon as the winch line 54 has been loosened. As soon as the docking subassembly 62 moves out of the docked position 62A, the control unit 38 at least partially limits operation of the feed system 32. For example, the control unit 38 may be configured to stop rotation of the feed wheels 46 when the docking subassembly 62 is in the undocked position 62B. In some embodiments, the cutting assembly 34 is configured to operate when the docking subassembly 62 is in the docked position 62A and also when the docking subassembly 62 is in the undocked position 62B. This configuration allows the operator to resume processing waste materials as soon as the docking subassembly 62 returns to the docked position 62A with the winch line 54 tensioned and with the line end 58 secured to the keeper 64. However, it is conceivable that the control unit 38 could also be configured to limit, prevent, or otherwise interrupt operation of the cutting assembly 34 when in the undocked position 62B.

While in the undocked position 62B (see FIG. 2B), the operator can use the winch assembly 36, such as by actuating the winch control interface 60 to control the winch driver 56. After the operator has utilized the winch assembly 36, the winch line 54 can subsequently be routed through the catch portion 86 of the hanger 82 of the docking subassembly 62, the line end 58 can be secured to the keeper 64, and the winch driver 56 can be used to re-tension the winch line 54 (see FIG. 2A) against the docking subassembly 62. Here, as the winch line 54 tightens against hanger 82 of the docking subassembly 62, the hanger 82 moves towards the sensor plate 92 of the base 80. This movement causes the shaft 102 to rotate which simultaneously stores energy in the biasing elements 112 and brings one of the cam members 108 into engagement with the docking sensor 98 (see FIG. 7). Once the docking sensor 98 is engaged in the docked position 62B, the control unit 38 resumes operation of the feed system 32 and the operator can continue operation of the waste processing machine 20 to reduce waste materials.

It will be appreciated that the orientation of and the relative positioning between the docking subassembly 62 and the keeper 64 may be adjusted to accommodate differently configured waste processing machines 20. As noted above, and as is depicted in FIGS. 1A-2B, the keeper 64 is positioned vertically below and both longitudinally and laterally away from the docking subassembly 62. Specifically, the keeper 64 and the docking subassembly 62 are positioned and oriented so as to effect pivoting of the shaft 102 when the winch line 54 is tensioned against the hanger 82, as noted above, but not during conventional use of the winch assembly 36 whereby proper positioning of the line end 58 ensures that the winch line 54 exits the guide 70 and extends away from the infeed system 30 so as to pull materials towards the infeed system 30 from behind the waste processing machine 20.

As noted above, it will be appreciated that the docking subassembly 62 and/or the keeper 64 can be configured in a number of different ways without departing from the scope of the present invention. By way of non-limiting example, the keeper 64 could be realized by any suitable structure sufficient to secure the line end 58 and allow the winch line 54 to tension against the docking subassembly 62. Moreover, the docking subassembly 62 described above could be configured in any suitable way sufficient to effect limited operation of the cutting assembly 34 and/or the feed system 32 until tension in the winch line 54 results from the line end 58 engaging the keeper 64, without departing from the scope of the present invention. Thus, the various components and structure of the docking subassembly 62 described above could be arranged, disposed, or configured in a number of different ways, or could be omitted in part or entirely, without departing from the scope of the present invention.

As such, the winch docking safety system 40 of the present invention disclosed herein significantly reduces safety issues in connection with waste processing machines 20 by preventing or limiting use of the feed system 32 while the winch assembly 36 is being utilized. Specifically, the present invention prevents the winch line 54 from being retracted towards the waste processing machine 20 and, at the same time, affords opportunities for promoting optimized and safe operation of the waste processing machine 20. Thus, physical injuries to operators and other bystanders, as well as damage to the waste processing machine 20 and other property, may be averted.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A waste processing machine for reducing waste material and having a winch docking safety system, comprising:
   a frame;
   a cutting assembly disposed on said frame for reducing waste material;
   a feed system disposed on said frame for directing waste material toward said cutting assembly;
   a winch assembly for selectively directing waste material toward said feed system, said winch assembly comprising a winch line extending to a distal line end for securing waste material, and a winch driver coupled to said frame and in communication with said winch line to urge said line end toward said winch driver;
   a keeper fixedly coupled to said frame and remaining stationary relative to said frame to secure said line end to said frame;
   a docking subassembly spaced from said keeper and movable between a docked position with said winch line tensioned against said docking subassembly between said winch driver and said line end and with said line end secured to said keeper, and an undocked position with said winch line loosened against said docking subassembly, said docking subassembly further comprising a docking sensor to detect movement between said docked position and said undocked position; and
   a control unit in communication with said feed system and said docking subassembly to allow operation of said feed system when said docking subassembly is in said docked position, and to at least partially limit operation of said feed system when said docking subassembly is in said undocked position.

2. The waste processing machine as set forth in claim 1, wherein said docking sensor comprises a limit switch.

3. The waste processing machine as set forth in claim 1, wherein said docking subassembly comprises:
   a base operatively attached to said frame; and
   a hanger coupled to said base and arranged for movement relative to said base between said docked position and said undocked position.

4. The waste processing machine as set forth in claim 3, wherein at least a portion of said winch line engages against said hanger when in said docked position.

5. The waste processing machine as set forth in claim 3, wherein said hanger comprises at least one catch portion shaped to engage said winch line in said docked position.

6. The waste processing machine as set forth in claim 5, wherein said catch portion has a generally C-shaped profile.

7. The waste processing machine as set forth in claim 3, wherein said docking subassembly further comprises a biasing element interposed between said base and said hanger to urge said hanger away from said docked position and toward said undocked position.

8. The waste processing machine as set forth in claim 3, wherein said docking subassembly further comprises:
   a bearing assembly coupled to said base; and
   a shaft coupled to said hanger and rotatably supported by said bearing assembly such that movement of said hanger between said docked position and said undocked position causes corresponding rotation of said shaft between a docked radial position and an undocked radial position.

9. The waste processing machine as set forth in claim 8, wherein said docking subassembly further comprises at least one arm extending between said shaft and said hanger.

10. The waste processing machine as set forth in claim 8, wherein said docking subassembly further comprises:
    a cam member fixed to said shaft for concurrent movement between said docked radial position and said undocked radial position; and
    wherein said docking sensor is operatively attached to said base and is arranged to engage said cam member in said docked radial position.

11. The waste processing machine as set forth in claim 10, wherein said docking subassembly further comprises a biasing element interposed between said base and said cam member to urge said shaft away from said docked radial position and toward said undocked radial position.

12. The waste processing machine as set forth in claim 1, wherein said winch assembly further comprises a boom coupled to said frame and extending from said winch driver to a boom end; and
    wherein said docking subassembly is operatively attached to said boom adjacent to said boom end.

13. The waste processing machine as set forth in claim 1, wherein said docking subassembly comprises a hanger with a catch portion shaped to engage said winch line in said docked position.

14. The waste processing machine as set forth in claim 13, wherein said catch portion has a generally C-shaped profile.

15. The waste processing machine as set forth in claim 1, wherein said keeper comprises a keeper mount operatively attached to said frame, and a receiver spaced from said keeper mount to secure said line end of said winch line.

16. The waste processing machine as set forth in claim 15, wherein said receiver of said keeper is further defined as an aperture.

17. The waste processing machine as set forth in claim 1, wherein said cutting assembly is configured to operate when said docking subassembly is in said docked position and also when said docking subassembly is in said undocked position.

18. The waste processing machine as set forth in claim 1, wherein said docking subassembly comprises:
    a base operatively attached to said frame; and
    a portion coupled to said base and arranged for movement relative to said base between said docked position and said undocked position.

19. The waste processing machine as set forth in claim 1, wherein said docking subassembly further comprises:
    a base operatively attached to said frame;
    a bearing assembly coupled to said base; and
    a shaft rotatably supported by said bearing assembly such that movement between said docked position and said undocked position causes corresponding rotation of said shaft between a docked radial position and an undocked radial position.

20. The waste processing machine as set forth in claim 19, wherein said docking subassembly further comprises:
    a cam member fixed to said shaft for concurrent movement between said docked radial position and said undocked radial position; and
    wherein said docking sensor is operatively attached to said base and is arranged to engage said cam member in said docked radial position.

21. The waste processing machine as set forth in claim 20, wherein said docking subassembly further comprises a biasing element interposed between said base and said cam member to urge said shaft away from said docked radial position and toward said undocked radial position.

* * * * *